J. W. NEAL.
HYDRAULIC AIR COMPRESSOR.
APPLICATION FILED NOV. 7, 1908.
946,683.
Patented Jan. 18, 1910.
3 SHEETS—SHEET 1.
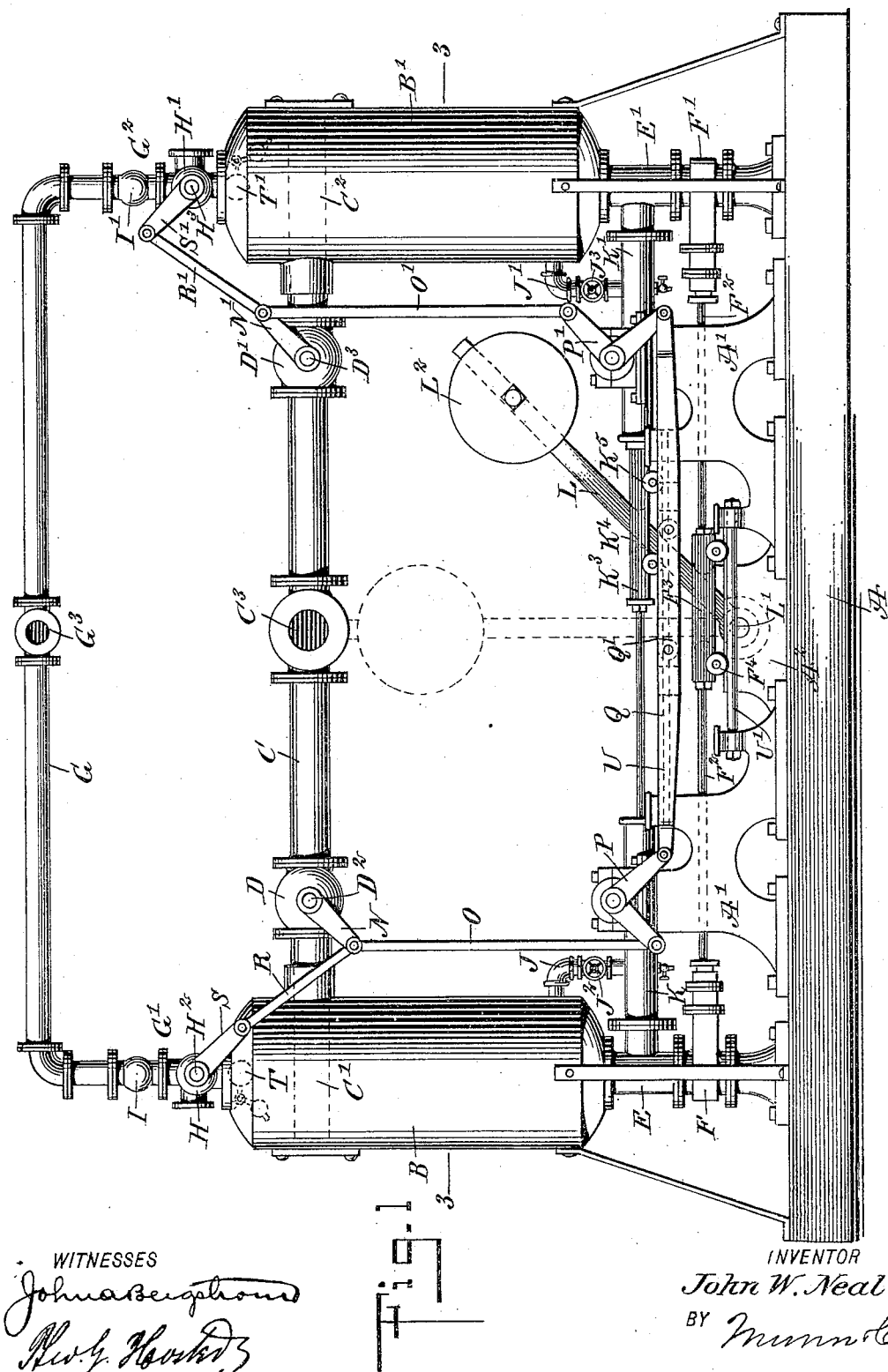
WITNESSES
INVENTOR
John W. Neal
BY
ATTORNEYS

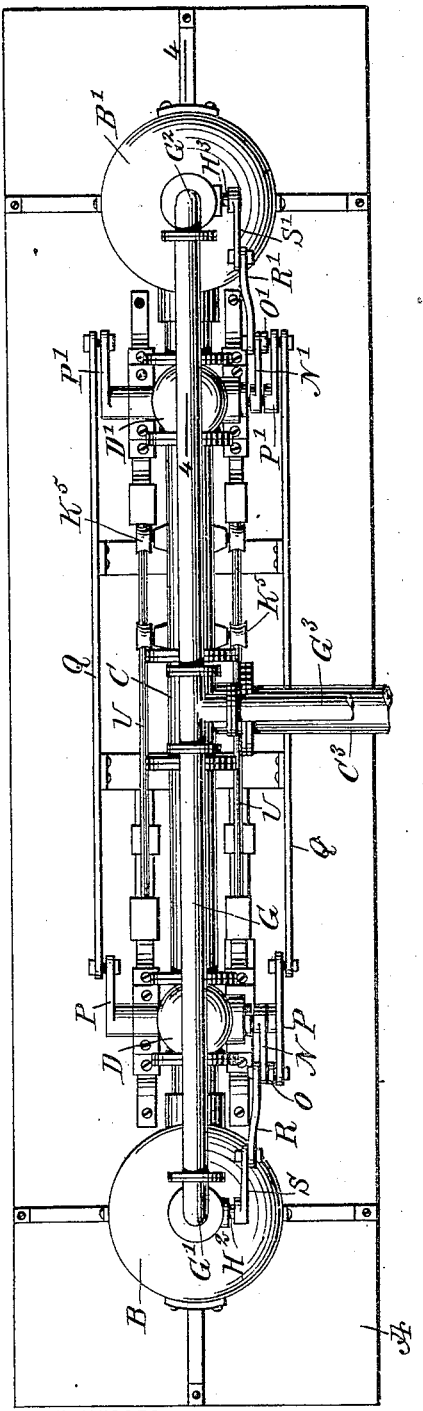
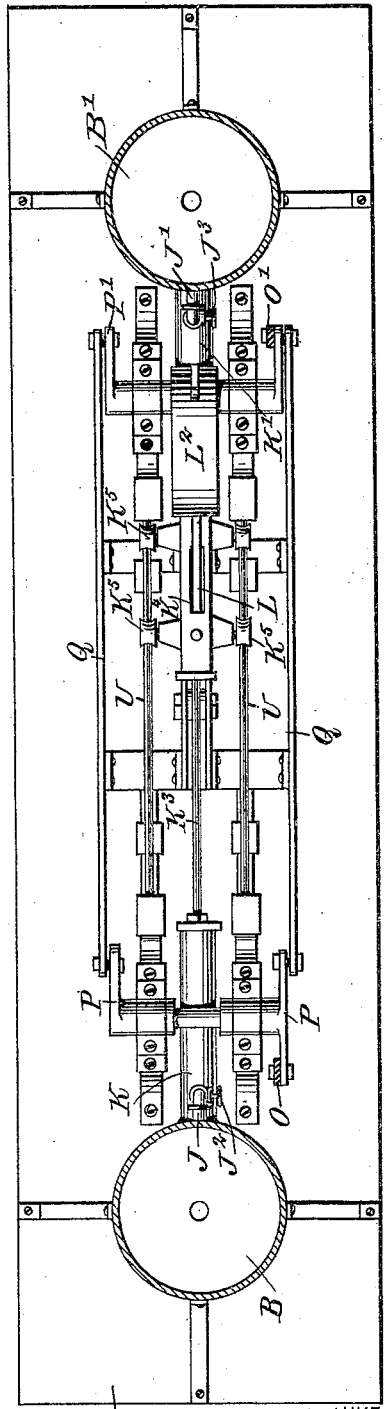

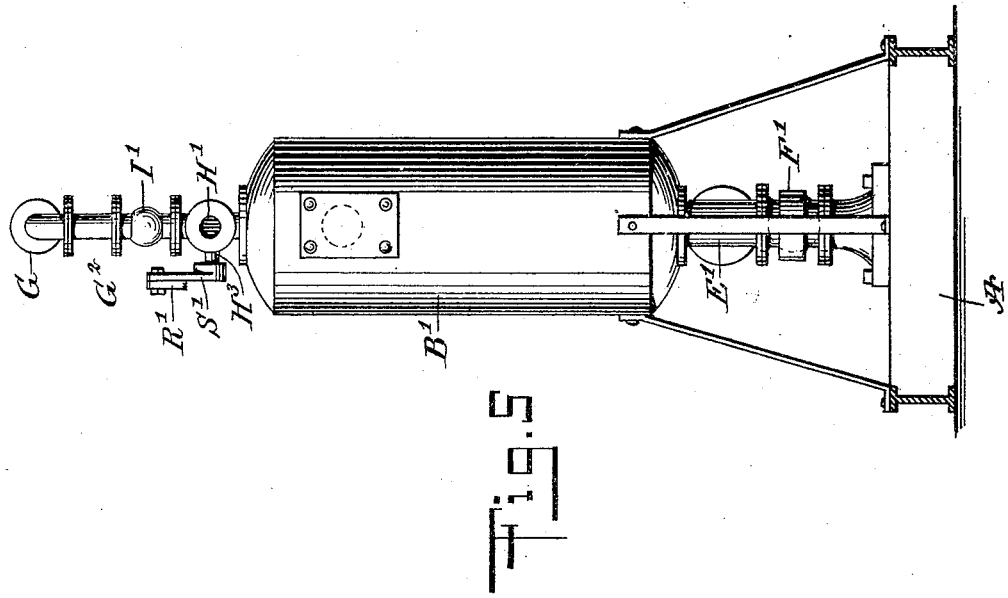
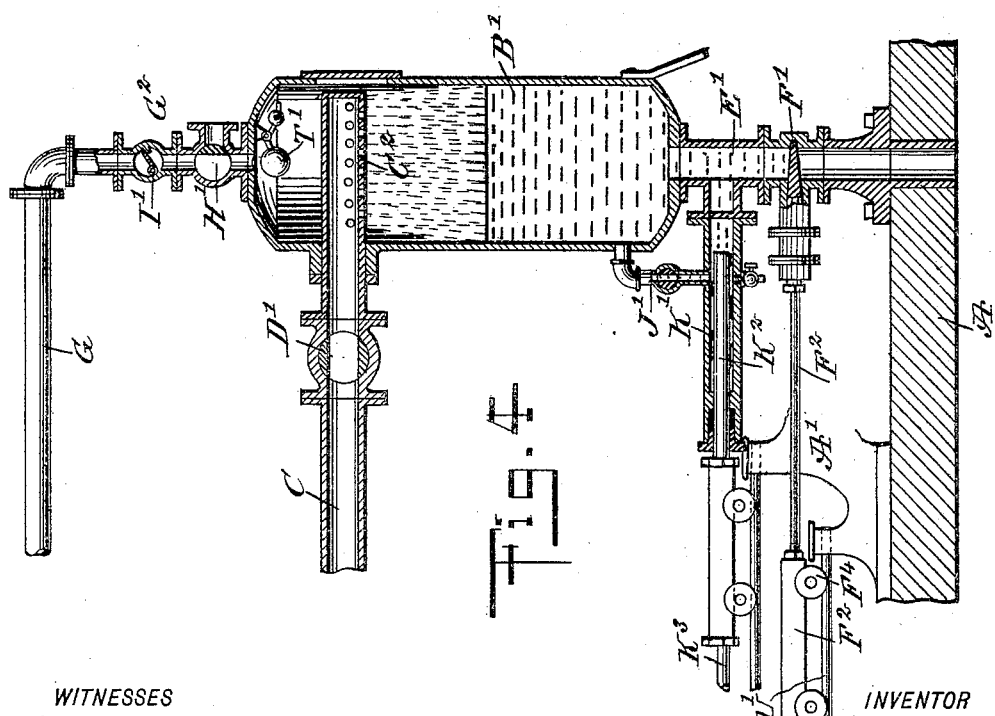

UNITED STATES PATENT OFFICE.

JOHN WALKER NEAL, OF KEALIA, TERRITORY OF HAWAII.

HYDRAULIC AIR-COMPRESSOR.

946,683. Specification of Letters Patent. Patented Jan. 18, 1910.

Application filed November 7, 1908. Serial No. 461,499.

*To all whom it may concern:*

Be it known that I, JOHN WALKER NEAL, a citizen of the United States, and a resident of Kealia, Kauai, Hawaii, have invented a new and Improved Hydraulic Air-Compressor, of which the following is a full, clear, and exact description.

The invention relates to hydraulic air compressors, more especially designed for use with wave motors, such, for instance, as shown and described in the Letters Patent of the United States, No. 851,549 and No. 855,258, granted to me on April 23, 1907, and May 28, 1907, respectively.

The object of the invention is to provide a new and improved hydraulic air compressor, arranged to utilize the force of the pumped water to compress the air isothermally in a very simple and efficient manner.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement; Fig. 2 is a plan view of the same; Fig. 3 is a sectional plan view of the same on the line 3—3 of Fig. 1; Fig. 4 is a sectional side elevation of the same on the line 4—4 of Fig. 2; and Fig. 5 is a rear end elevation of the same.

On a suitably constructed base A are supported the vessels B and B', in which the air is isothermally compressed by the use of pumped sea water, as hereinafter more fully explained. Into the upper ends of the vessels B and B' extend the perforated terminals C', C² of a water supply pipe C, connected at or near its middle with the discharge pipe C³ of a water pump, actuated by a suitable motor, such as the wave motor above referred to. The pipe C is provided adjacent to the vessels B and B' with valves D, D' adapted to be alternately opened and closed, so as to alternately discharge the water from the pipe C by way of the perforated ends C', C² into the vessels B and B'.

From the bottom of the vessels B and B' lead the water outlet pipes E, E', for conducting the water discharged from the vessels B, B' to a suitable place of discharge, and in the said water outlet pipes E and E' are arranged gate valves F and F', adapted to be alternately opened and closed in unison with the valves D, D', that is, when the valve F is opened the valve D is closed, and vice versa, and when the valve F' is closed the valve D' is opened and vice versa.

The tops of the vessels B and B' are connected with the ends G', G² of an air pipe G, for conducting the air compressed in the vessels B and B' to a reservoir or the like, located at any desired place, that is, in case the hydraulic air compressor is used on a wave motor, the reservoir is located on shore and is connected by a pipe G³ with the air pipe G, at or near the middle thereof, as indicated in Figs. 1 and 2. The ends G', G² of the air pipe G are provided with three-way valve H, H', each arranged for controlling the inflow and outflow of the air, as hereinafter more fully explained. In the ends G', G² of the air pipe G are also arranged check valves I, I', to prevent return flow of the compressed air from the pipe G.

The lower ends of the vessels B and B' are connected by small pipes J, J' with the closed ends of the cylinders K, K', mounted on supports A', and the said pipes are provided with valves J², J³ for controlling the flow of the water through the said pipes. The cylinders K and K' are provided with pistons K² connected with each other by a common piston rod K³, provided near its middle with an opening K⁴, through which extends a lever L, fulcrumed at its lower end L' on a support A² attached to the base A. On the lever L is adjustably secured a weight L², and the lever L is adapted to intermittently actuate mechanisms connected with the valves D, D', F, F', and H, H', so as to intermittently open and close the same. For the purpose mentioned the stems D², D³ of the valves D, D' are provided at their outer ends with arms N, N' connected by links O, O' with bell crank levers P, P', fulcrumed on the supports A', and pivotally connected with each other by a link Q, having an elongated slot Q', through which extends the lever L. The arms N, N' are also connected by links R, R' with arms S, S', secured on the stems H², H³ of the three-way valves H and H', to actuate the same with a view to connect the interior of the corresponding vessel B or B' with the pipe G or with the outer air.

The gate valves F, F' have a stem F² provided with a slot F³, through which extends the lever L, so that when the latter is swung from the right to the left or from the left to the right then a corresponding sliding motion is given to the common stem F² and the link Q, to actuate the several valves D, D', F, F' and H, H' simultaneously. Within the upper ends of the vessels B and B' are arranged float valves T, T', for closing or opening the entrances of the ends G', G² of the pipe G, the said float valves T, T' being normally open and adapted to be closed by the water rising in the vessels B, B'.

The common piston rod K³ is preferably provided with friction wheels K⁵, mounted to travel on guideways U, attached to the supports A', and the stem F² is also preferably provided with friction wheels F⁴, mounted to travel on suitable guideways U', so as to properly support the piston rod K³ and the stem F² to insure a proper sliding of the same when acted on by the lever L, as hereinafter described.

The operation is as follows: When the several parts are in the position illustrated in the drawings, then the valve D is closed, the valve D' is open, the valve F is open, the valve F' is closed, the valve H connects the interior of the vessel B with the atmosphere, while the valve H' connects the interior of the vessel B' with the air pipe G. Now water pumped through the pipe C is sprayed within the vessel B' owing to the perforated end C² of the pipe C extending within the upper end of the vessel B'. As the water is sprayed in this vessel B' and fills the same, it compresses and cools the air contained therein, the compressed and cooled air passing out of the upper end of the vessel B' into the end G², and past the check valve I' into the pipe G and to the reservoir to be filled.

It is understood that the air contained in the vessel B' is gradually compressed as the water rises therein, and as the air is forced upward through the spray of water issuing from the perforations of the end C², it is evident that the air is cooled while being compressed. When the water in rising in the vessel B' reaches the upper end thereof, the air is nearly all ejected from the vessel B', and the rising water now acts on the float valve I', so as to swing the same into a closed position, thus closing the entrance to the pipe end G², to prevent the water from rising in the said pipe end. After the air is all forced out of the vessel B', and the space previously occupied by the air is now filled by the water, it is evident that the water in the vessel B' finally reaches the same pressure as that in the pipe C. The water under pressure fills the cylinder K' by way of the pipe J', and when the desired pressure has been reached then the water in the cylinder K' acts on the piston K² thereof and forces the piston K² from the right to the left, so that the piston rod K³ imparts a swinging motion to the weighted lever L, to swing the latter from the right to the left.

It is understood that after the weighted lever L reaches a vertical position, it engages the left-hand wall of the slot Q', and on the further movement of the lever L to the left it imparts a corresponding motion to the link Q and the mechanisms connected with the valves D, D' and H, H', so as to open the valve D and to close the valve D', and to open the valve H' to the atmosphere, while the valve H connects the pipe end G' with the vessel B. During this further swinging movement of the lever L from a vertical position to the left, it next engages the left-hand wall of the slot F³, so that the piston rod F² is shifted from the right to the left, whereby the valve F' is opened while the valve F is closed. The water in the vessel B' can now run out of the same, while the water passes in a spray into the vessel B, to accumulate therein and to compress and to cool the air in the vessel in the same manner as above described in reference to the vessel B'.

It is understood that when the lever L swings from the right to the left, as above mentioned, the piston in the cylinder K forces the water contained therein out through the pipe J into the vessel B, but as the pipe J is a small one it is evident that the device is relieved of undue shocks during the swinging over motion of the lever L; that is, the water in the cylinder K acts as a shock absorber. When the water flows out of the vessel B', as above mentioned, the float valve T' opens, thus admitting air from the outside into the vessel B', to insure proper outflow of the water contained in the vessel B', at the same time refilling the latter with atmospheric air. At about the time the vessel B' is emptied of water, the other vessel B is filled with water and the air expelled therefrom, so that the water pressure acts on the piston in the cylinder K, to force the said piston to the right, thus imparting a swinging motion to the lever L from the left to the right. When this takes place, the lever, on reaching a vertical position engages the right-hand end of the slot Q', to shift the link Q to the right, so that the valve mechanism for the valves D, D' and H, H' is actuated to close the valve D and to open the valve D', and to connect the interior of the vessel B with the atmosphere, by way of the valve H, and to close the interior of the vessel B' to the atmosphere by the valve H'. The lever L next comes in contact with the right-hand end of the slot F³, to shift the piston rod F² from the left to the right, thus opening the valve F and closing the valve F'. The water now flows out of the vessel B and flows in the vessel B', and the above-described operation is repeated.

From the foregoing it will be seen that by the arrangement described, the water pumped into the vessel B or B' is sprayed therein, so as to cool the air and simultaneously compress the same. It will also be noticed that the working of the compressor is wholly automatic, and by adjusting the weight $L^2$ on the lever L, the apparatus can be set for compressing the air to a higher or lower degree, as desired. When the reservoir in which the air is discharged attains a predetermined pressure then the hydraulic air compressor stops compressing air in the vessels B and B', but alternately fills and empties the vessels B and B' with the lever L swinging alternately from the right to the left and vice versa, as above described.

By the arrangement described air is hydraulically compressed at a high pressure with a slow motion, and the air is cooled by a water spray, and the friction incident to the working parts is reduced to a minimum.

Having thus described my invention, I claim as new and desire to secure by Letters Patent:

1. A hydraulic air compressor, comprising a vessel having an air inlet and outlet and a water discharge, a water supply for said vessel, a cylinder connected with the said vessel, a piston in the cylinder and controlled by pressure from said vessel, the said piston having a piston rod, a weighted lever engaged and actuated by said piston rod, and mechanism actuated from said weighted lever for controlling the inflow and outflow of the water and air.

2. A hydraulic air compressor, comprising a vessel having a valved air inlet and outlet, and a valved water discharge, a valved water supply pipe having a perforated terminal within the upper end of the vessel, a weighted lever mounted to swing, mechanism actuated from said weighted lever and connected with the valves for controlling the same, a cylinder connected with said vessel, a piston in the cylinder governed by the pressure in said vessel, the piston having a piston rod arranged to engage and swing said lever.

3. A hydraulic air compressor, comprising a vessel provided at the top with a valved air inlet and outlet, and at the bottom with a valved water discharge, a water supply pipe connected with a water supply under pressure and having a perforated terminal within the upper end of the said vessel, a cylinder connected with the said vessel, a piston in the said cylinder and controlled by pressure from the said vessel, a weighted lever arranged to be directly engaged and actuated by the rod of the said piston, valves for controlling the inflow and outflow of the water and air to and from the said vessel, and valve-operating mechanism connected with the said valves and intermittently controlled from the said weighted lever.

4. A hydraulic air compressor, comprising a pair of vessels, a water supply pipe connected with a source of water under pressure and having perforated ends extending within the upper ends of the said vessels, valves in the said water supply pipe, water outlets leading from the lower ends of the said vessel and having valves, an air pipe having its ends connected with the upper ends of the said vessels, float valves in the said vessels controlling the entrances to the said air pipe, a check valve, and a three-way valve in each end of the said air pipe, cylinders connected with the lower ends of the said vessels, pistons in the said cylinders and having their piston rods arranged to be directly engaged and moved by each other, a weighted lever connected with the said connected piston rods, and valve mechanisms intermittently actuated by the said lever and connected with the said water supply pipe valves, the said three-way valves and the said water outlet valve.

5. A hydraulic air compressor, comprising a vessel provided at its top with a valved air inlet and outlet, and at the bottom with a valved water discharge, a water supply pipe connected with a water supply under pressure, and having a perforated terminal within the upper end of the said vessel, a horizontally arranged cylinder, a valve controlled pipe connecting the lower part of said vessel with the cylinder, a piston in said cylinder having a piston rod, guideways on which the piston rod is mounted to travel, the piston being controlled by pressure from said vessel, a weighted lever actuated from said piston rod, and means actuated by the movement of said weighted lever for controlling the inflow and outflow of the water and air.

6. A hydraulic air compressor, comprising a vessel provided at the top with an air inlet and outlet, and at the bottom with a water discharge, a water supply pipe opening within the upper part of the vessel, a horizontally arranged cylinder connected with the lower end of said vessel, a piston in the said cylinder and controlled by water pressure from the said vessel, the piston having a rod mounted to travel on guideways, a weighted lever connected with and actuated by the movement of said piston rod, a link actuated by the said lever, valves for controlling the inflow and outflow of air and the inflow of water to said vessel, mechanism connecting the link with said valves to operate the latter, a valve for controlling the outflow of water from said vessel, the said valve having a stem actuated from said weighted lever, and guideways on which the said stem is mounted to travel.

7. A hydraulic air compressor, comprising a vessel having an air inlet and outlet and a water discharge, a water supply pipe having spraying means within the upper end of said vessel, a cylinder connected with the said vessel, a piston in said cylinder and controlled by pressure from the said vessel, a weighted lever connected with the piston rod of said piston and actuated by the movement of the piston, valves for controlling the inflow and outflow of air and the inflow of water, valve-operating mechanism connected with said valves and intermittently controlled from the said weighted lever, and a gate valve for controlling the outflow of water from said vessel, the said weighted lever being connected with the stem of said gate valve.

8. A hydraulic air compressor, comprising a vessel having an air inlet and outlet at the top, and a water discharge pipe leading from its bottom, a water supply pipe having spraying means within the upper end of said vessel, a horizontally arranged cylinder below the vessel and connected with the lower part of said vessel, a piston in the cylinder and controlled by pressure from the said vessel, a weighted lever connected directly with the piston rod of said piston and actuated by the movement of the piston, valves for controlling the inflow and outflow of air and the inflow of water, valve operating mechanism connected with said valves and controlled from the said weighted lever, and a gate valve in the water discharge pipe having a stem, the said weighted lever being adapted to engage and move the said stem.

9. A hydraulic air compressor, comprising a vessel having a valved air inlet and outlet and a valved water discharge, a valved water supply for said vessel, a cylinder connected with the said vessel, a piston in said cylinder controlled by pressure from said vessel, the said piston having a piston rod, a weighted lever engaged and actuated by the piston rod, a link engaged and actuated by the weighted lever, connections between the said link and the air inlet and outlet valve and the water inlet valve, for controlling said valves, the said water discharge valve having a stem adapted to be engaged and moved by the said lever to control the valve.

10. A hydraulic air compressor, comprising a pair of vessels each having an air inlet and outlet and a water discharge, means for supplying water to said vessels, cylinders connected with said vessels, pistons in the said cylinders having a common piston rod, the said pistons being controlled by pressure from said vessels, and mechanisms actuated by the movement of said common piston rod for controlling the inflow and outflow of the water and air.

11. A hydraulic air compressor, comprising a pair of vessels, each having a valved air inlet and outlet and a valved water discharge, a valved water supply pipe for said vessels having perforated terminals within the upper ends of the vessels, cylinders connected with the said vessels, pistons in the said cylinders having a common piston rod, the said pistons being controlled by pressure from said vessels, mechanisms connected with the valves for controlling the same, and means actuated by the movement of said common piston rod for controlling said mechanisms.

12. A hydraulic air compressor, comprising a pair of vertically arranged vessels each having an air inlet and outlet at its upper end and a water discharge at its lower end, means for supplying water to the upper part of said vessels, horizontally arranged cylinders connected with the lower part of said vessels, pistons in the said cylinders having a common piston rod, the said pistons being controlled by pressure from said vessels, and mechanisms actuated by the movement of said common piston rod for controlling the inflow and outflow of the water and air.

13. A hydraulic air compressor, comprising a pair of vessels, each having an air inlet and outlet and a water discharge, means for supplying water to said vessels, cylinders connected with said vessels, pistons in the said cylinders having a common piston rod, the said pistons being controlled by pressure from said vessels, a weighted lever mounted to swing and connected with the said common piston rod, whereby the movement of the piston rod in either direction swings the said lever, and mechanisms actuated by the movement of said lever for controlling the inflow and outflow of the water and air.

14. A hydraulic air compressor, comprising a pair of vessels, each provided at the top with an air inlet and outlet, and at the bottom with a water discharge pipe, a water supply pipe having its ends opening within the upper ends of the said vessels, cylinders connected with the lower ends of said vessels, pistons in the said cylinders and controlled by water pressure from the said vessels, the said pistons having a common piston rod provided with an opening, a weighted lever extending through the opening in the piston rod and actuated by the movement of the said pistons, valves for controlling the inflow and outflow of water and air to and from the said vessels, and valve operating mechanisms connected with said valves and controlled by the movement of said weighted lever.

15. A hydraulic air compressor comprising a pair of vessels each provided at the top with an air inlet and outlet and at the bottom with a water discharge pipe, a water supply pipe opening into the upper ends of said vessels, horizontally arranged cylinders connected with the lower ends of said vessels, pistons in the said cylinders and controlled by water pressure from the said vessels, the said pistons having a common piston rod provided with an opening, a weighted lever extending through the opening in the piston rod and fulcrumed at its lower end, the said lever being actuated by the movement of the said pistons, a link having an opening through which the said lever extends, the said link being actuated by the movement of the weighted lever, valves for controlling the inflow and outflow of air, and the inflow of water to said vessels, connections between the said link and the said valves for operating the latter, and gate valves for controlling the outflow of water from said vessels, the said gate valves having a common stem provided with a slot through which the said lever extends, the gate valves being controlled by the movement of said weighted lever.

16. A hydraulic air compressor, comprising a support, a pair of vessels mounted on said support, and each provided at the top with a valved air inlet and outlet and at the bottom with a water discharge pipe, valve controlled water supply pipes opening into the upper ends of said vessels, horizontally arranged cylinders connected with the lower ends of said vessels, pistons in the said cylinders and controlled by water pressure from said vessels, the said pistons having a common piston rod provided with an opening at the center thereof, a link having an opening, connections between the said link and the air inlet and outlet valves, and the water inlet valves for controlling said valves, gate valves for the water discharge pipe having a common stem provided with an opening, a weighted lever extending through the openings in the piston rod, link and valve stem and fulcrumed at its lower end, the said lever being actuated by the movement of the common piston rod and controlling the movements of said link and said gate valve stem, the said common piston rod and the said gate valve stem being provided with wheels, and guideways on the said support on which the said wheels are mounted to travel.

In testimony whereof I have signed my name to this specification in the presence of two subscribing witnesses.

JOHN WALKER NEAL.

Witnesses:
M. R. TEVES,
JOAQUIM DE SOUZA.